United States Patent
Calhoun et al.

(10) Patent No.: US 10,523,331 B2
(45) Date of Patent: Dec. 31, 2019

(54) INCREASING RF POWER OUTPUT IN PHOTONICS-FED PHASED ARRAY ANTENNA SYSTEMS

(71) Applicant: PRECISION OPTICAL TRANSCEIVERS INC., Rochester, NY (US)

(72) Inventors: David M. Calhoun, Victor, NY (US); Stefan Preble, Pittsford, NY (US)

(73) Assignee: PRECISION OPTICAL TRANSCEIVERS INC., Rochester, NY (US)

( * ) Notice: Subject to any disclaimer, the term of this patent is extended or adjusted under 35 U.S.C. 154(b) by 0 days.

(21) Appl. No.: 15/869,870

(22) Filed: Jan. 12, 2018

(65) Prior Publication Data

US 2019/0222320 A1    Jul. 18, 2019

(51) Int. Cl.
*H04Q 11/00* (2006.01)
*H04B 10/564* (2013.01)
(Continued)

(52) U.S. Cl.
CPC .......... *H04B 10/564* (2013.01); *H01Q 21/22* (2013.01); *H04B 10/25753* (2013.01);
(Continued)

(58) Field of Classification Search
CPC ............ H04B 10/564; H04B 10/25753; H04B 10/1143; H04B 10/25758;
(Continued)

(56) References Cited

U.S. PATENT DOCUMENTS 4,739,334 A    4/1988    Soref
4,885,589 A    12/1989   Edward et al.
(Continued)

OTHER PUBLICATIONS

Righini, G.C., et al., "Glass Optical Waveguides: A Review of Fabrication Techniques," Optical Engineering 53(7), 071819 (Jul. 2014).
(Continued)

*Primary Examiner* — Ted M Wang
(74) *Attorney, Agent, or Firm* — Fox Rothschild LLP; Robert J. Sacco

(57) ABSTRACT

Delivering a radio frequency (RF) signal to a remote phased array antenna system involves using an optical modulator at an RF source location to modulate a high power optical carrier signal with a source RF signal $S_{RF}$ so as to produce a high power transmit modulated optical carrier (TMOC) signal. An optical link communicates the high power TMOC signal to a remote antenna location, where the high power TMOC is split into N optical paths to obtain N reduced power TMOC signals. In each of the N optical paths, photodetection operations are performed upon the reduced power TMOC signal to obtain N reduced power $S'_{RF}$ signals which are then constructively combined to obtain a high power $S'_{RF}$ signal which is communicated to at least one antenna element.

19 Claims, 7 Drawing Sheets

(51) Int. Cl.
*H01Q 21/22* (2006.01)
*H04B 10/2575* (2013.01)

(52) U.S. Cl.
CPC ..... *H04Q 11/0005* (2013.01); *H04Q 11/0062* (2013.01); *H04B 2210/006* (2013.01); *H04Q 2011/0039* (2013.01); *H04Q 2011/0096* (2013.01)

(58) Field of Classification Search
CPC ............. H04B 10/25752; H01Q 21/22; H04Q 11/0005; H04Q 11/0062; H04J 14/0298
See application file for complete search history.

(56) References Cited

U.S. PATENT DOCUMENTS

| | | | |
|---|---|---|---|
| 5,117,239 | A | 5/1992 | Riza |
| 5,333,000 | A | 7/1994 | Hietala et al. |
| 5,751,242 | A * | 5/1998 | Goutzoulis ............. G01S 7/032 342/157 |
| 5,867,295 | A | 2/1999 | Betts |
| 6,229,482 | B1 | 5/2001 | Vaughan |
| 6,836,515 | B1 | 12/2004 | Kay et al. |
| 7,446,696 | B2 | 11/2008 | Kondo et al. |
| 7,545,868 | B2 | 6/2009 | Kennedy et al. |
| 7,724,179 | B2 | 5/2010 | Williams et al. |
| 8,180,183 | B1 | 5/2012 | Yap |
| 9,070,972 | B2 | 6/2015 | Wang et al. |
| 9,525,489 | B2 | 12/2016 | Schuetz et al. |
| 9,614,280 | B2 | 4/2017 | Shi et al. |
| 9,831,901 | B2 | 11/2017 | Kpodzo et al. |
| 10,103,823 | B1 | 10/2018 | Kyrolainen et al. |
| 10,312,999 | B2 | 6/2019 | Neuman |
| 2003/0090777 | A1 * | 5/2003 | Yap ..................... H01Q 3/2676 359/333 |
| 2004/0208636 | A1 | 10/2004 | Reynolds et al. |
| 2006/0067709 | A1 | 3/2006 | Newberg et al. |
| 2007/0280704 | A1 * | 12/2007 | Fitzgerald ............ H01Q 3/2676 398/198 |
| 2008/0225375 | A1 | 9/2008 | Newberg et al. |
| 2009/0067772 | A1 | 3/2009 | Khurgin et al. |
| 2009/0110398 | A1 | 4/2009 | Pfeiffer |
| 2009/0263144 | A1 * | 10/2009 | McKinney ......... H04B 10/2507 398/214 |
| 2011/0038632 | A1 | 2/2011 | Zou |
| 2012/0070151 | A1 | 3/2012 | Shin et al. |
| 2012/0189308 | A1 | 7/2012 | Watanabe |
| 2013/0202308 | A1 | 8/2013 | Middleton et al. |
| 2014/0126914 | A1 | 5/2014 | Berlin et al. |
| 2015/0349892 | A1 | 12/2015 | Fischer et al. |
| 2017/0207531 | A1 | 7/2017 | Murakowski |
| 2018/0091335 | A1 | 3/2018 | Schnizler |
| 2018/0102847 | A1 | 4/2018 | Kim et al. |
| 2019/0212472 | A1 | 7/2019 | Tennant et al. |
| 2019/0222320 | A1 | 7/2019 | Calhoun et al. |

OTHER PUBLICATIONS

Longbrake, M., "True Time-Delay Beamsteering for Radar," Wright State University, Air Force Research Laboratory Sensors Directorate, Dayton, OH, 2012 IEEE National Aerospaceand Electronics Conference (NAECON), Jul. 2012.

Chang, Chia-Ming, et al., "High-power dual-fed traveling wave photodetector circuits in silicon photonics," Aug. 24, 2015, vol. 23, No. 17, DOI: 10.1364/OE.23.022857, Optics Express 22857.

Beling, A., et al., "InP-based waveguide photodiodes heterogeneously integrated on silicon-on-insulator for photonic microwave generation," Nov. 4, 2013, vol. 21, No. 22, DOI: 10.1364/OE.21.025901, Optics Express 25901.

* cited by examiner

US 10,523,331 B2

INCREASING RF POWER OUTPUT IN PHOTONICS-FED PHASED ARRAY ANTENNA SYSTEMS

BACKGROUND

Statement of the Technical Field

This document concerns photonic devices, and more particularly concerns photonic devices which facilitate a radio frequency system.

Description of the Related Art

The physics of integrated photodetectors limit their optical-to-electrical conversion gain. One limitation is attributed to restrictions on optical input power—optical waveguides that normally feed integrated photodetectors have an upper limit on guided optical power. Another limitation is attributed to saturation effects of the photodetector itself. The achievable optical-to-electrical conversion efficiency of any single photodetector is then constrained in according to its optical and electrical feeding structures.

As the demand for communication bandwidth continues to increase, many wireless providers are turning towards higher frequency carriers: microwave (3-30 GHz) or millimeter wave (30-300 GHz). However these higher frequency carriers suffer from greater free-space propagation loss. To mitigate these effects constructive interference between a plurality of antenna elements can be used to focus the electro-magnetic radiation in one direction and thus increase an amount of antenna gain achieved in a particular direction. Such systems are sometimes referred to as phased array antenna systems, or more simply as "phased arrays."

Still, the design and implementation of phased array antenna systems is complex and involves many challenges. Among the most significant of such challenges is the need to control the amplitude and phase of signals associated with each of the plurality of antenna elements. Such control is essential in order to generate the desired antenna gain pattern for the composite array. Various designers have adopted different approaches to facilitate such control. For example, some systems utilize RF electronics in the signal path for each antenna channel, whereas other systems adopt all digital control of the signals. Still other systems utilize a hybrid approach.

SUMMARY

The disclosure concerns a method for delivering a radio frequency (RF) signal to a remote phased array antenna system. The method involves using an optical modulator at an RF source location to modulate a high power optical carrier signal with a source RF signal $S_{RF}$ so as to produce a high power transmit modulated optical carrier (TMOC) signal. An optical link (e.g., an optical fiber) is used to communicate the high power TMOC signal from the RF source location to an antenna location associated with an RF antenna system, the antenna location different from the RF source location. For example, the antenna location can be remote from the RF source location such that the two locations may be separated by a kilometer or more.

At the antenna location, the high power TMOC is split into N optical paths to obtain N reduced power TMOC signals, where N is an integer value greater than 1. In each of the N optical paths, a photodetection operation is performed upon the reduced power TMOC signal to obtain N reduced power $S'_{RF}$ signals. Thereafter, the N reduced power $S'_{RF}$ signals are constructively combined in an RF power combiner to obtain a high power $S'_{RF}$ signal. The resulting $S'_{RF}$ signal is then communicated to at least one antenna element of the RF antenna system. In some scenarios, the splitting, optical converting, and RF power combining for producing the high-power RF $S'_{RF}$ signal can be implemented on an integrated circuit formed on a Silicon substrate.

According to one aspect, a value of N can be chosen such that a multiplicity of reduced power $S'_{RF}$ signals are combined in the combining step. Consequently, a power level of $S'_{RF}$ can exceed a maximum power handling ability of a photodetector used in each of the N optical paths.

According to another aspect an optical conversion structure is used to optically convert the reduced power TMOC from a less-confined geometry associated with a high power waveguide used in a high power optical splitter to a more confined geometry associated with a feed waveguide for a photodetector. The optical conversion structure can comprise an adiabatic-type waveguide transition, whereby the optical conversion is performed with low optical loss.

A phase of the $S'_{RF}$ signal can be dynamically varied prior to communicating the $S'_{RF}$ signal to the at least one antenna element. In some scenarios, the at least one antenna element can include a plurality of antenna elements comprising an array. In such instances, a phase variation applied to the $S'_{RF}$ signal can be coordinated to facilitate a phased array beam forming operation.

This disclosure also concerns a phased array communication system. The system includes an optical modulator at an RF source location which is configured to modulate a high power optical carrier signal with a source RF signal $S_{RF}$ so as to produce a high power transmit modulated optical carrier (TMOC) signal. An optical link comprised of an optical fiber is configured to communicate the high power TMOC signal from the RF source location to an antenna location associated with an RF antenna system, the antenna location different from the RF source location. A high power optical power splitter is disposed at the antenna location and is configured to split the high power TMOC into N optical paths to obtain N reduced power TMOC signals, where N is an integer value greater than 1.

Each of the N optical paths is comprised of a photodetector configured to produce a reduced power $S'_{RF}$ signal from the reduced power TMOC signal, and a feed waveguide configured for coupling one of the N reduced power TMOC signals to the photodetector. Each optical path can further include an optical conversion structure configured to optically convert the reduced power TMOC signal from a less-confined geometry associated with a high power waveguide used in the high power optical power splitter to a more confined geometry associated with the feed waveguide. An RF combiner is provided to receive the reduced power $S'_{RF}$ signal from each of the N optical paths, and constructively combine the N reduced power $S'_{RF}$ signals to obtain a high power $S'_{RF}$ signal. The system further includes at least one phase control element responsive to a control system. As such, the phase control element is configured to dynamically steer an RF beam produced using the high power $S'_{RF}$ signal (e.g., by dynamically controlling a signal phase).

In some scenarios, the high power optical splitter is comprised of a splitting network which is configured to split the optical power passively in a tree of 3 dB splits. In other embodiments, the high power optical splitter is comprised of a multi-mode interference (MMI) device which is configured to directly split the high power TMOC signal into N output waveguides.

In some scenarios, two or more components selected from the group consisting of the high power optical splitter, the optical conversion structure, the feed waveguide, the photodetector and the RF combiner, can comprise a multi-chip material integration (MCMI) fabrication. In such scenarios two or more of the high power optical splitter, the optical conversion structure and the feed waveguide comprise a first integrated circuit chip on a first substrate of the MCMI fabrication. The photodetector can be disposed on a different substrate comprising a second integrated circuit chip of the MCMI fabrication. Further, the RF combiner can be disposed on a third substrate of the MCMI fabrication. According to one aspect, the first and second substrates are disposed on the third substrate whereby the third substrate is a unifying substrate of the MCMI fabrication.

The system can further include at least one control unit configured to coordinate a phase variation applied to the $S'_{RF}$ signal so as to facilitate a phased array beam forming operation. In some scenarios, the control unit can include at least one processing unit which is embedded as part of the RF antenna system.

In some scenarios, the system can include a plurality of the optical modulators described herein which generate a plurality of the high power TMOC signals at the RF source location. In such a scenario, a plurality of optical links can be provided to communicate a plurality of the high power TMOC signals from the RF source location to the RF antenna system. Accordingly, a plurality of modules can be provided at the RF antenna system. Each such module can independently perform for each high power TMOC signal the splitting, photodetection, combining and beam forming operations as described herein.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
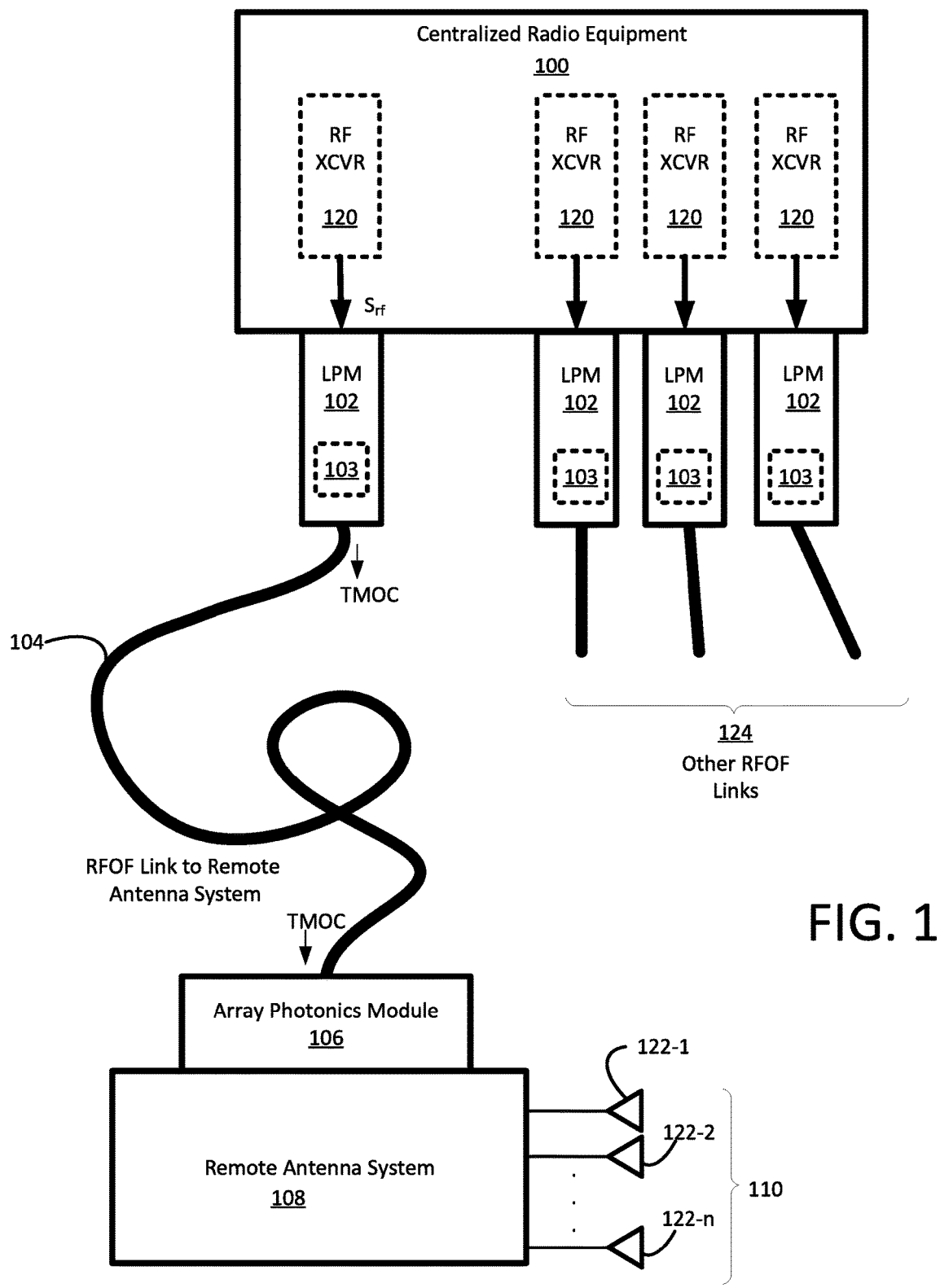
FIG. 1 is a block diagram which is useful for understanding how a high power RF signal can be generated at a remote antenna location using a high power modulated optical signal.

It will be readily understood that the components of the embodiments as generally described herein and illustrated in the appended figures could be arranged and designed in a wide variety of different configurations. Thus, the following more detailed description of various embodiments, and as represented in the figures, is not intended to limit the scope of the present disclosure, but is merely representative of various embodiments. While the various aspects of the embodiments are presented in drawings, the drawings are not necessarily drawn to scale unless specifically indicated.

This disclosure concerns communications systems where a remote array consisting of one or more antennas are fed using fiber optic links. In such a system a microwave (3 GHz to 30 GHz) or millimeter wave (30 GHz to 300 GHz) radio frequency (RF) signal can be modulated onto an optical carrier. The modulated optical signal is then communicated (e.g. communicated using optical fiber) to a photodetector at a remote location where the modulated RF signal is extracted from the modulated optical signal. The photodetector can be a substantial distance from the source of the RF signal. For example, the photodetector can be several kilometers away from RF signal source and optical modulator. In some scenarios, the photodetector is located at a remote site associated with an RF antenna system.

In a communications system as described, the final optical-to-electrical conversion gain at the photodetector is in the critical path for both regenerating the RF signal at suitable power levels for transmission, and recovering a received RF signal within a strict signal budget. The physics of integrated photodetectors limit their optical-to-electrical conversion gain. One limitation is attributed to restrictions on optical input power—optical waveguides that normally feed integrated photodetectors have an upper limit on guided optical power. Another limitation is attributed to saturation effects of the photodetector itself. Transimpedance amplifiers (TIAs) are the status quo for achieving electrical gain on a photodetector; however, TIAs imply added circuit complexity and are not always integrate-able with the photonic technology.

To overcome such limitations, a photodetector array architecture is provided which uses integrated photonics to feed a phased array antenna. According to one aspect a number, N, of photodetectors are fed using power-matched integrated optical waveguides. More particularly, integrated photonics waveguide technology is used to feed relatively high input optical power to N number of 1/N reduced optical power paths using a 1-to-N split from high power waveguides to standard photodetector-feeding waveguides. The N modulated optical signals respectively communicated to the N photodetectors result in a total of N RF signal outputs which are produced by the N photodetectors. These N RF outputs are thereafter combined in a phase-and-impedance-matched electrical waveguide network, after which the resulting combined RF signal can be communicated to an antenna element comprising an array. The system as described substantially improves optical-to-electrical conversion gain by operating N photodetectors in an array configuration to boost delivered RF signal power. The resulting higher power RF signal can then be communicated to one or more antenna elements. For example in some scenarios the increased power RF signal can be communicated to one or more antenna elements associated with an antenna array.

In some scenarios where the antenna array comprises a plurality of antenna elements, it can be desirable to independently control the phase and amplitude of the RF signals which are applied to each antenna element comprising the array. For example, such phase and amplitude adjustments can facilitate RF beam forming (including beam steering). In such scenarios, additional processing steps can be employed to facilitate the phase and amplitude control requirements. Any suitable technique can be used for performing these phase and amplitude adjustments. In some scenarios the RF phase and amplitude adjustments can be applied in the electronic or RF signal domain. In such scenarios the adjustments can be applied to the RF signal after it has been regenerated at the photodetectors and recombined in an RF signal combiner. In other scenarios these adjustments to the phase and gain can be applied in the optical domain using devices which act upon the modulated optical carrier.

Figure 2:
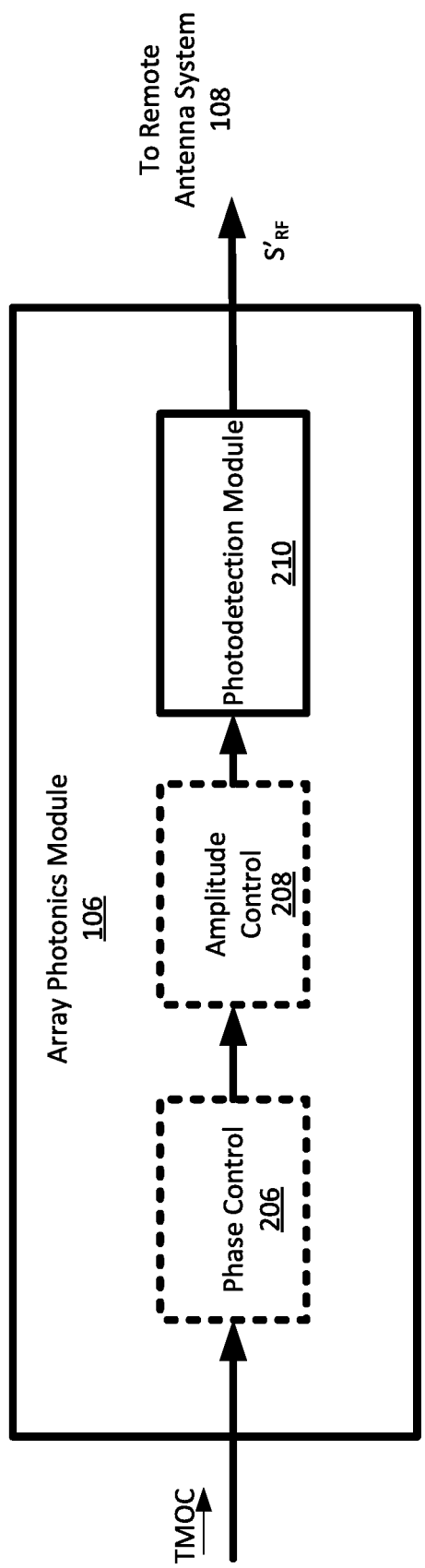
FIG. 2 is a block diagram that is useful for understanding certain aspects of an array photonics module.

Referring now to FIGS. 1 and 2, centralized radio equipment 100 can include one or more RF transceiver systems 120. In some scenarios, each RF transceiver system 120 is capable of processing RF signals associated with a respective remote antenna system 108. Such processing can include transmit operations, receive operations, or both. In FIG. 1, only a single remote antenna system 108 is shown to avoid unnecessarily complicating the drawing. However, it should be understood that one or more remote antenna systems 108 can be respectively provided for each of the RF transceiver systems 120.

An RF transmit signal from an RF transceiver system 120 is communicated to a local photonics module (LPM) 102 proximate the RF transceiver system 120. In the LPM 102 an optical modulator is used to modulate the RF signal onto an optical carrier, thereby forming a transmit modulated optical carrier (TMOC). The optical modulator 103 is an electro-optical conversion device which modulates an RF transmit signal from the transceiver 120 onto an optical carrier. The LPM 102 provides the resulting TMOC signal as an output to optical waveguide 104. The optical modulator 103 can make use of an electro-optic effect such that an RF signal (e.g., a modulated RF signal) can be imposed on the phase, frequency, and/or amplitude of the optical beam.

Optical modulators are well-known and therefore will not be described here in detail. However, it should be understood that an electro-optic effect used to facilitate such modulation can be a change or modification of a refractive index associated with an optical waveguide. In some scenarios, an optical waveguide in the optical modulator can be comprised of a material such as lithium niobate, which is known to have a refractive index that varies in the presence of an electric field. In other scenarios, optical waveguides can be achieved using a silicon-based integrated photonics platform, where methods for achieving similar refractive index variation exist. Furthermore, the overall optical modulator structure could consist of several integrated circuit technologies consisting of differing materials where the performance characteristics of combining these materials becomes advantageous. In this way, electronic drivers needed to drive low-power digital or analog signal waveforms can be implemented on a different integrated circuit (IC) as compared to the optical waveguides for the optical modulator.

The output from LPM 102 can be of relatively high power. In some scenarios, high power optical signals can be understood to include optical signals greater than about 15 dBm, particularly when working with traditional silicon-based integrated photonics. Still higher powers are possible when working in III-V compound semiconductors obtained by combining group III elements (e.g., Al, Ga, In) with group V elements (e.g., N, P, As, Sb). Further, additional gain stages (not shown) can be provided that will increase optical power of the TMOC to levels in the 30-40 dBm range. These additional gain stages could be realized with standard Erbium Doped Fiber Amplifiers (EDFA's) that are part of the optical fiber link or there can be Semiconductor Optical Amplifiers (SOA's) along the link.

The optical amplifier gain stages included in the LPM can be disposed before the input to the optical modulator, at the output of the optical modulator, or both. In some scenarios, amplifiers (particularly SOAs) can be included in the LPM by means of a multi-chip module integration (MCMI), where electronic bias circuits and the optical inputs and outputs of the amplifiers are connected to the other local electronics and photonics of the LPM via a unifying substrate. The applicability of MCMI to the various embodiments disclosed herein is discussed below in greater detail. However, it will be appreciated that MCMI implementations are particularly advantageous where the materials needed to achieve the optical amplifiers differ greatly from those used to achieve the other component features of the LPM.

The resulting high power TMOC is communicated to an array photonics module 106 by means of a suitable optical waveguide 104, such as an optical fiber. As such, the optical waveguide 104 is sometimes referred to herein as an RF Optical Fiber (RFOF) link. The optical waveguide 104 is advantageously selected to accommodate the high power TMOC. As such the optical waveguide 104 can be conventional silica core/silica clad/polymer coated fibers having a core size and cladding which are designed for transmission of high power optical signals. Other types of optical waveguide can also be used without limitation provided that they are robust enough for carrying the high power TMOC. If the centralized radio equipment 100 includes multiple RF transceivers 120, then additional RFOF links 124 can be provided respectively to link each such RF transceiver 120 to a corresponding remote antenna system 108.

The array photonics module 106 can be located remote from the centralized radio equipment 100 and LPM 102. For example, the array photonics module 106 can be located several kilometers from these components. Further, the array photonics module 106 can be located in close proximity to its corresponding remote antenna system 108. The array photonics module 106 is comprised of at least photodetection module 210.

Figure 4:
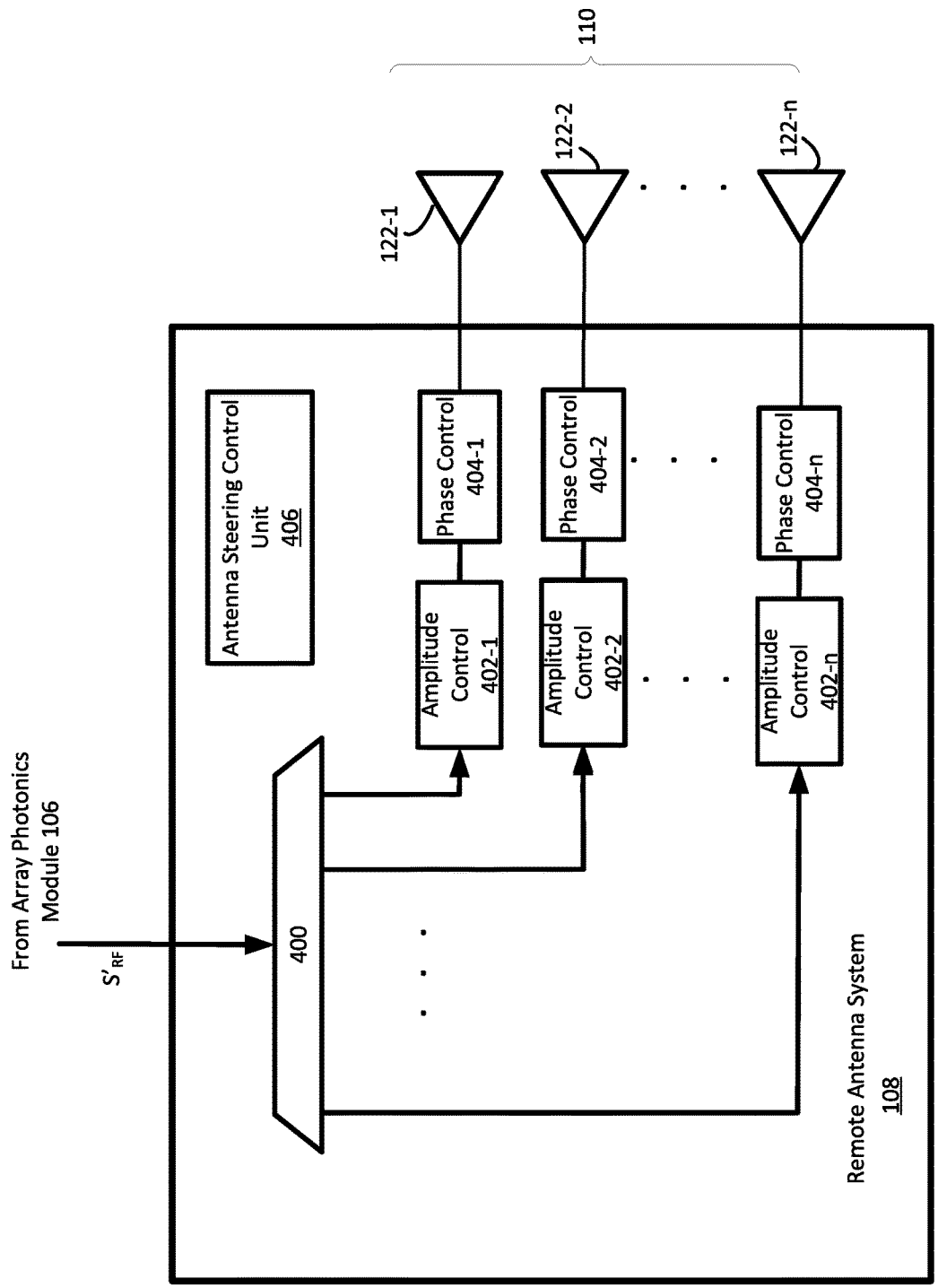
FIG. 4 is block diagram that is useful for understanding an example of a remote antenna system.

In some scenarios, the array photonics module 106 can include additional optical processing elements which perform operations in the optical domain other than those associated with photodetection. For example, these optional optical processing operations can be utilized to selectively control the phase and amplitude of the RF signal which is subsequently extracted from the TMOC by the photodetector. In such a scenario, the array photonics module 106 can include one or more phase control component(s) 206, and amplitude control component(s) 208. In such scenarios, it can be advantageous to implement one or more of the phase and/or amplitude control components using MCMI. However, the embodiments are not limited in this regard and in other scenarios such phase and amplitude control components can be absent from the photonics module 106. In such embodiments, the phase and amplitude control of the RF signal output from the photodetector can instead be applied in a subsequent processing step in the RF domain. For example, these adjustments can be applied as shown in FIG. 4 using electronic circuitry in the remote antenna system 108.

Furthermore, where it is advantageous, the components of the array photonic module 106 can be implemented using separate materials systems and integrated into a multi-chip module. In such a scenario, the individual functions of each electronic, optical, and/or photonic component in 106 can be optimized for best individual performance. These components can then be physically combined in a standard assembly process by applying conventional techniques for integration of integrated electronics and photonics.

It should be understood that the arrangements in FIGS. 1 and 2 represents one possible scenario which is useful for understanding certain aspects of the disclosure. However, embodiments are not limited in this regard and other implementations are also envisioned within the scope of the present invention. For, example in some scenarios, one or several LPMs 102 can feed one or several arrayed photonics modules 106. Such arrangements can be useful to facilitate system realizations related to wavelength division multiplexing (WDM) and systems wherein multiple RF signals are multiplexed by using multiple antennas for multiple-input and multiple-output (MIMO) implementations. Additional RFOF links 124, optical combiners and splitters can be provided as necessary to help facilitate such implementations.

Figure 3:
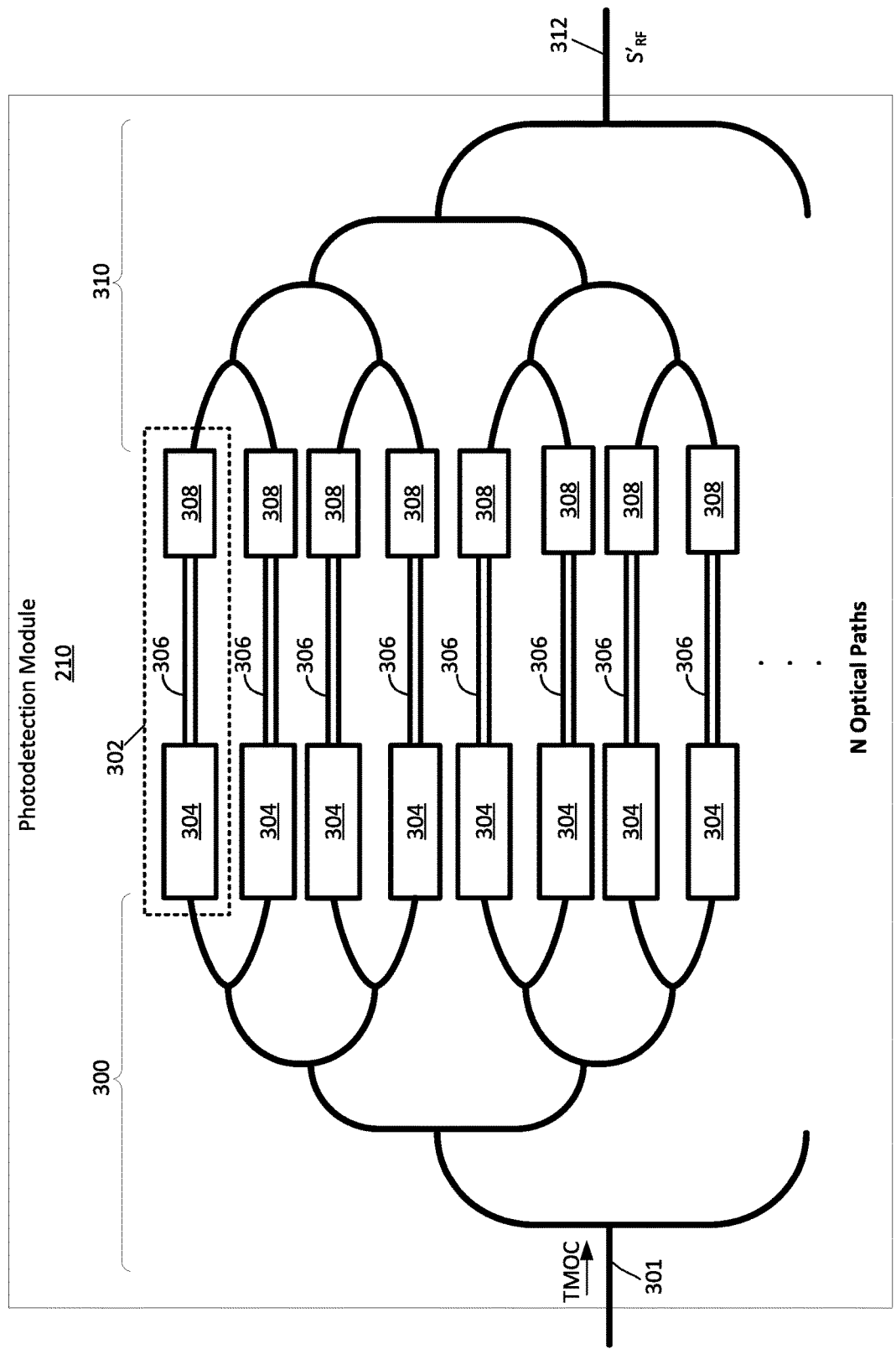
FIG. 3 is a schematic diagram that is useful for understanding a photodetection module which can be used in the array photonics module.

Details of a photodetection module 210 are shown in FIG. 3. In some scenarios, the photodetection module 210 can be comprised of a photonic integrated circuit (PIC). As is known, a PIC is made using semiconductor fabrication techniques in which photolithography is used to pattern wafers for etching and material deposition. As such, the photodetection module 210 can be a hybrid device which includes optical components, electronic components, electro-optical components, and RF waveguide structures integrated on one or more device substrates. According to one aspect, the photodetection module 210 can be fabricated from materials such as silicon or lithium niobate. However, the embodiments are not limited in this regard and other material fabrication systems can also be used.

As shown in FIG. 3 the TMOC is optically coupled to a high power integrated photonics waveguide 301 at the input of the photodetection module. Waveguide 301 feeds the high power TMOC to a high power optical power splitter 300. The high-power optical power splitter splits the high power TMOC into N optical paths 302, where N is an integer greater than one. According to one aspect, N is an integer greater than 10. Alternatively, N can be an integer greater than 100, or greater than 1000. From the foregoing it will be appreciated that the high power optical splitter can split the TMOC signal into a multiplicity of optical paths 302, each carrying a reduced power TMOC signal.

The optical power splitting operation in high power optical splitter 300 can be accomplished using high power optical waveguide in a splitting network which fans the optical power passively in a tree of 3 dB splits. As is known, the overall optical power reduction at a single one of the N output splits can be determined as 3 dB*$\log_2(N)$. This characteristic power reduction is well-known and easily achievable with conventional means. So in a scenario where a multiplicity of optical paths 302 are provided (e.g. N is greater than 1, 10, 100, or 1000) the optical signal carried in each of the N optical paths 302 can be greatly reduced as compared to the optical power associated with the TMOC. Alternative implementations can involve other types of splitting techniques. For example, a multi-mode interference (MMI) device could be used to directly split the signals into N output waveguides. This could be done in multiple stages in order to reach N>100-1000. An MMI could be advantageous in such an application as it would have the potential to reduce the overall circuit footprint.

The high power optical waveguides used in the high-power optical power splitter 300 are advantageously comprised of materials having properties which are selected so that the waveguides are capable of supporting confinement of high power optical modes. As is known, waveguides of this type are carefully designed to solve issues related to localized optical intensity by utilizing materials which facilitate a reduction in nonlinear optical responses (two photon absorption, free-carrier absorption, Kerr nonlinearity and other nonlinear optical mixing processes) and/or involve spreading the optical mode over a large physical area. Generally, this technology is well-known in the art and readily achievable in nearly all photonic integrated circuits. Accordingly, the details of the high power splitter 300 will not be discussed here in detail. However, it will be appreciated that the exact design of the high-power optical waveguides will depend to a great extent on the actual power level of the high power TMOC signal.

Each optical path 302 can be comprised of several components including an optical conversion structure 304, a feed waveguide 306, and photodetector 308. As is known, a photodetector 308 is an optical to electrical conversion structure. As such, the photodetector 308 is optically-fed with waveguides whose power confinement is selected to best serve the physical geometries and material structure of the photodetector. Designing the optical waveguide feed for any given on-chip or chip-to-chip photodetector interface is a well-known art in photonic integrated circuits and therefore will not be described here in detail. Still, it will be appreciated that the specific implementation of the photodetector feed waveguide 306 will depend substantially upon the choice and requirements of photodetector 308. Further, the requirements for the waveguide feed are unlikely to be the same as for the waveguide used in the high power splitter due to the different power handling requirements. In this regard, the feed waveguide 306 is likely to utilize a waveguide geometry, material or technology which is different as compared to the high power optical waveguides used in high-power splitter 300. This variation with respect to waveguide type and requirements motivates the need for the optical conversion structure 304.

The optical conversion structure 304 serves to convert the optical mode's confined power from a less-confined geometry (e.g., a geometry associated with the high power waveguide used in the high power optical splitter 300) to a more confined geometry (e.g., a geometry associated with the feed waveguide 306). An optical conversion structure which is suitable for this purpose includes an adiabatic-type waveguide transition. Adiabatic waveguide transitions are commonly used in photonic integrated circuits and are well-known in the art. Accordingly, the optical conversion structure 304 will not be described here in detail. However, it will be appreciated that the details of the particular optical conversions structure 304 used in a particular embodiment will depend on certain variables. For example, these variable can include the requirements of the waveguide selected for use in the high power optical splitter 300 and the requirements of the feed waveguide 306 (as dictated by the needs of the photodetector 308).

The photodetector 308 is an optical to electrical signal converter (opto-electric converter) which receives the modulated optical carrier signal as an input. The photodetector will extract the modulated RF signal from the TMOC and produces the RF signal as an output. Photodetectors as referenced herein are well known in the art and therefore will not be described detail. However, it should be understood that such devices will commonly include a solid state semiconductor element which varies an electric current responsive to the incident optical signal. Notably, in the system disclosed herein, the N channel split of the TMOC signal greatly reduces the power level of the optical signal communicated to each photodetector 308. Consequently, the potential for saturation of the photodetector 308 is minimized.

The TMOC will comprise an optical carrier signal and a modulated optical sideband signal, which is offset in frequency from the optical carrier. The continuous wave optical carrier signal will be converted by the photodetector to a DC output signal. But an optical carrier and its RF modulated optical sideband will interfere with each other at the photodetector so that an alternating electrical current variation is introduced in the DC output of the photodetector. This alternating electrical current variation will correspond to the original RF signal, $S_{RF}$. In some scenarios the demodulated RF signal may be phase shifted and gain adjusted in accordance with the operations involving the phase control element 206 and amplitude control element 208.

The output of the photodetectors 308 in each optical path 302 will be in phase with each other and are coupled to an input of an RF signal power combiner 310. RF power combiners are well-known in the art and therefore will not be described here in detail. However, it should be appreciated that the RF power combiner 310 will advantageously comprise a phase-and-impedance-matched electrical waveguide network. Consequently the RF signals extracted by the photodetector 308 in each of the optical paths 302 will be advantageously combined in phase at the output 312 of the RF combiner 310. The resulting RF signal $S'_{RF}$ at RF power combiner output 312 can be a relatively high power RF signal since it is derived from an array of N photodetectors. The high power signal output at 312 is coupled to the remote antenna system 108 which communicates the RF signal to one or more of the antenna elements 122-*n* comprising the antenna array 110.

In the embodiments disclosed herein, choosing a value of N such that a multiplicity of reduced power $S'_{RF}$ signals are combined in the RF combiner 310, will allow a power of level of $S'_{RF}$ to exceed by one or more orders of magnitude, a maximum power conversion ability of a photodetector 308 used in each of the N optical paths. This approach of optically delivering high power RF signals to a remote location offers significant advantage with regard to preventing distortion of the $S_{RF}$ signal carried by the TMOC. In particular, by splitting the high power TMOC to an array of photodetectors fed by high-confinement optical feeds as described herein, we avoid the need for interaction of high optical powers with such high confinement optical waveguides. It should be noted that non-linear optical effects are directly proportional to optical beam intensity. So this arrangement minimizes detrimental nonlinear optical effects (two photon absorption, free-carrier absorption and nonlinear optical mixing through the Kerr effect) by splitting the optical power evenly among the N optical channels in advance of such photodetection operations.

As noted above, for one or more components disclosed herein which employ combinations of electrical, optical, and/or photonic components, it can be advantageous to utilize multi-chip module integration (MCMI). As is known, MCMI can involve various operatively coupled modules which are fabricated from several varying material systems. Multi-chip modules are well-known in electronics, where a unifying substrate is used to provide electrical interconnections between different functional integrated circuits (ICs) such that the assembly of a plurality of these components is treated as a single component. Similarly, optical multi-chip modules (OMCM) can employ suitable optical interfaces. For example, in some scenarios a suitable optical interface for this purpose can be an adiabatic-type waveguide transitions that terminates at the physical edges or surfaces of the optical and/or photonic IC.

In such a scenario, an adiabatic-type waveguide transition can ensure that an optical mode field on one photonic IC (e.g., an IC based on material system 1, with specifically-engineered physical dimensions) is matched to another waveguide transition and mode field on another photonic IC (e.g. an IC based on material system 2, with specifically-engineered physical dimensions different from material system 1). Such waveguides can be coupled in a butt-coupled (side-by-side) or stacked (surface-to-surface) fashion. The technique is well-known and therefore will not be described in detail. However, it may be noted that this approach is very similar to the techniques used for coupling optical fibers to photonic ICs of any material system. The potential material systems comprise, but are not limited to, fabrication platforms achieved using silicon and III-V type semiconductors. Examples of components discussed herein that can be constructed in this manner include LPM(s) 102 and array photonics module 106.

Figure 7:
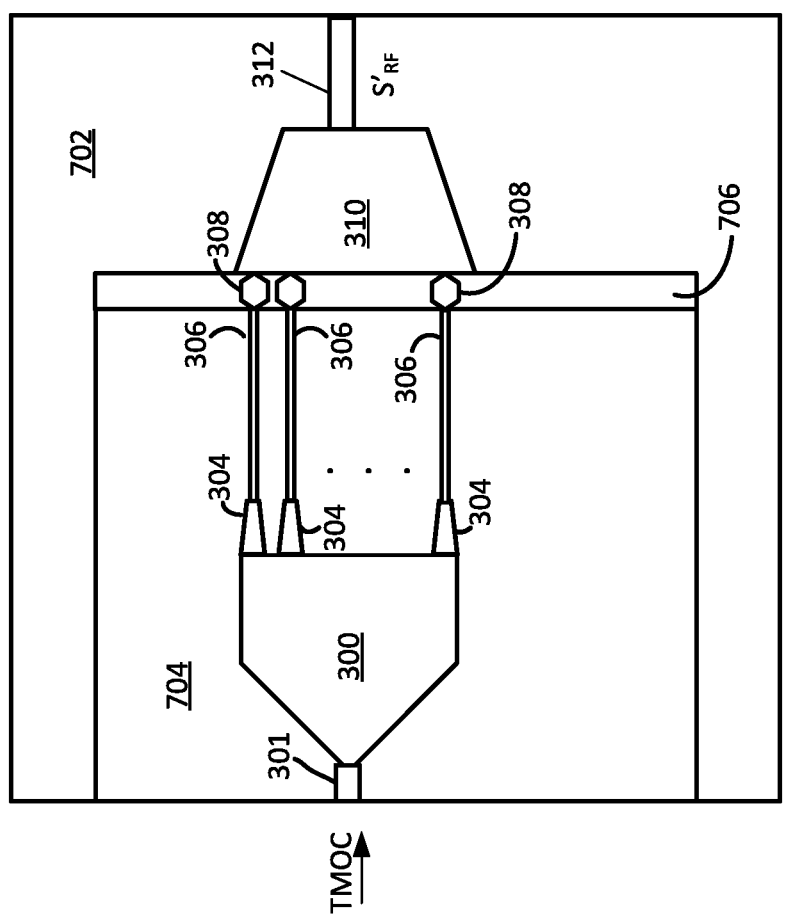
FIG. 7 is a schematic diagram that is useful for understanding how an array photonics module can be constructed using a multi-chip material integration approach.

Still, it will be appreciated that certain components of the system disclosed herein are advantageously disposed on the same integrated circuit. For example, as shown in FIG. 7, it can be advantageous for the optical splitter 300, the optical conversion structures 304, and the feed waveguides 306 to be present on a substrate 704 associated with a single common IC. The photodetector 308 can be fabricated on a separate substrate 706 with its own material system. In some scenarios, the RF combiner 310 can be implemented on a third substrate or on the unifying substrate 700 that combines the group including the combiner 300, the optical conversion structure 304, the feed waveguide 306 with the photodetector 308.

In a scenario in which phase and gain adjustments for beam steering are handled electronically in the RF domain, hardware elements for performing these operations can be included in the remote antenna system 108. Such an arrangement is shown in FIG. 4 in which the output $S'_{RF}$ from the array photonics module is communicated to the remote antenna system and is split into a plurality of RF signal paths using an RF power divider 400, where each RF path is associated with one of the antenna elements 122-1, 122-2, . . . 122-*n*. The phase of RF signals communicated along each RF signal path can be controlled using an electronic phase control components 402-1 . . . 402-*n*. Similarly, the amplitude or RF signals communicated along each RF signal path can be controlled using an electronic phase control components 404-1 . . . 404-*n*. These control components are responsive to control signals from an antenna steering control unit 406. The antenna steering control unit 406 is a control circuit or computer processor which is configured to control the phase and amplitude of signals associated with each antenna element 122-1 . . . 122-*n* to facilitate beam steering and beam forming using the antenna array. Of course the architecture shown in FIG. 4 is just one possible architecture which can be implemented for controlling a beam in a remote antenna system 108 and the embodiments are not intended to be limited to the particular arrangement shown.

The antenna steering control unit 406 in FIG. 4 can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the beam steering operations described herein. Alternative embodiments can be realized in several interconnected computer systems. Any kind of computer system or other apparatus adapted for carrying out the methods described herein is suited.

Figure 5:
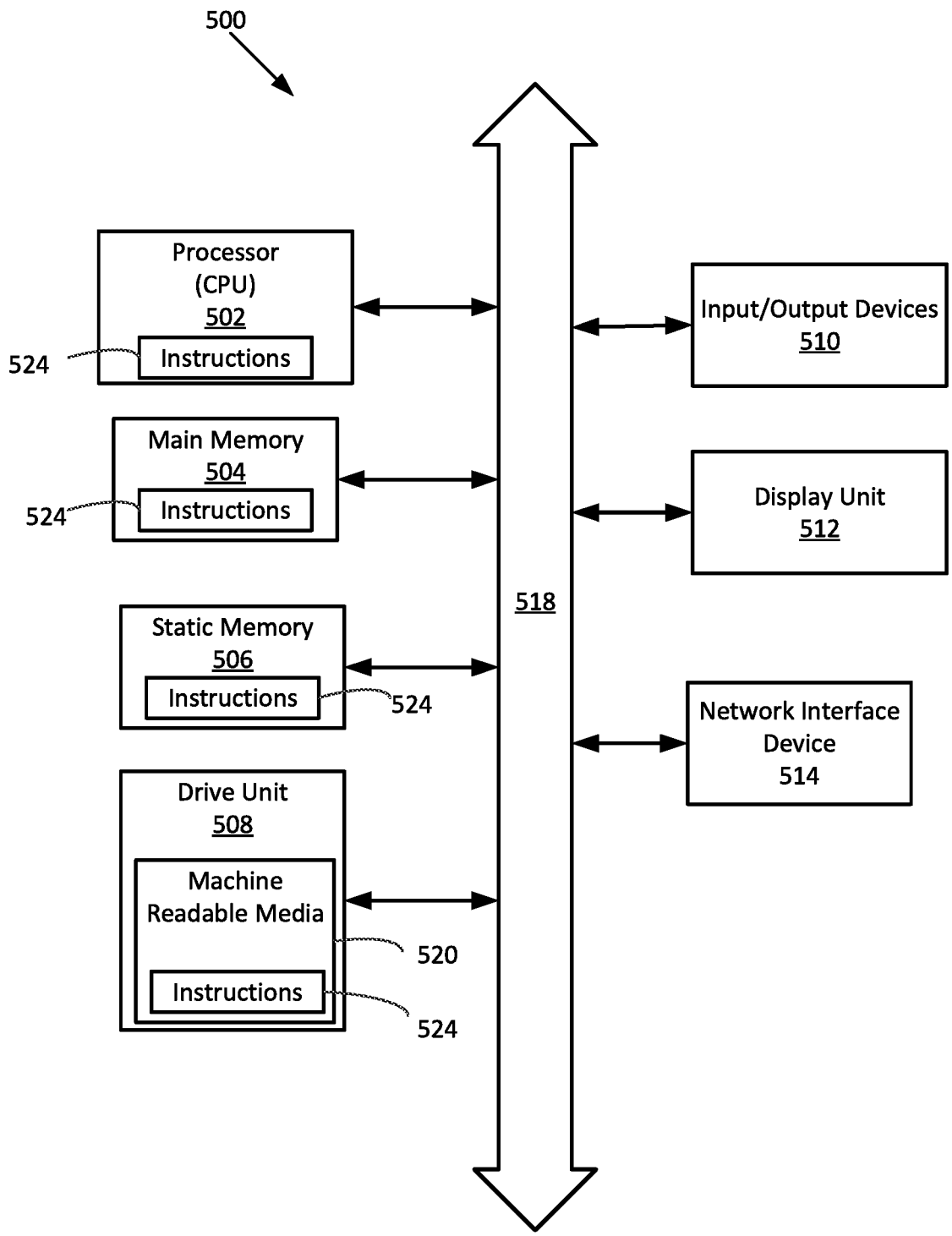
FIG. 5 is a block diagram which is useful for understanding an exemplary antenna steering control unit.

Referring now to FIG. 5, there is shown a hardware block diagram comprising an exemplary computer system 500 which is useful for understanding an implementation of the antenna steering control unit 406. The computer system 500 is a machine that can include a set of instructions which are used to cause the computer system to perform any one or more of the beam steering or beam forming methodologies discussed herein. In some embodiments, the computer 500 can operate independently as a standalone device. However, embodiments are not limited in this regard and in other scenarios the computer system can be operatively connected (networked) to other machines in a distributed antenna control system environment to facilitate certain operations described herein. Accordingly, while only a single machine is illustrated it should be understood that embodiments can be taken to involve any collection of similar machines that individually or jointly execute one or more sets of instructions as described herein.

The computer system 500 is comprised of a processor 502 (e.g. a central processing unit or CPU), a main memory 504, a static memory 506, a drive unit 508 for mass data storage and comprised of machine readable media 520, input/output devices 510, a display unit 512 (e.g. a liquid crystal display (LCD), a solid state display, or a cathode ray tube (CRT)), and a network interface device 514. Communications among these various components in FIG. 5 can be facilitated by means of a data bus 518. One or more sets of instructions 524 can be stored completely or partially in one or more of the main memory 504, static memory 506, and drive unit 508. The instructions can also reside within the processor 502 during execution thereof by the computer system. The input/output devices 510 can include a keyboard, a mouse, a multi-touch surface (e.g. a touchscreen) and so on. The network interface device 514 can be comprised of hardware components and software or firmware to facilitate wired or wireless network data communications in accordance with a network communication protocol utilized by a data network.

The drive unit 508 can comprise a machine readable media 520 on which is stored one or more sets of instructions 524 (e.g. software) which are used to facilitate one or more of the methodologies and functions described herein. The term "machine-readable media" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 500 should be understood to be one possible example of a computer system which can be used to facilitate certain antenna and beam steering control operations described herein. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. One manifestation of the control unit could be an embedded processor and peripherals that automatically perform control, and can received networked messages from a remote computer system 500. Such hardware implementations can in some scenarios be embedded with other hardware elements described herein. For example, these hardware components can be embedded as part of the remote antenna system 108. As such, applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Those skilled in the art will appreciate that conventional electrically-fed phased array antennas generally require co-location of the radio transceiver hardware and antenna hardware. This co-location also includes gain components such as power amplifiers, which boost gain from phase-controlled signals to antenna elements. The system described herein advantageously allows for decentralization of radio hardware and antenna array hardware in a RF over fiber fed remote antenna network.

A further important advantage achieved with the architecture disclosed herein is that optical to electrical power conversion efficiency is maximized. Photodetectors saturate when illuminated with high optical powers. There has been significant research into photodetectors (including unitravelling carrier photodetectors) that can handle high powers. However, such conventional approaches require materials such as III-V compound semiconductors, which are obtained by combining group III elements (e.g., Al, Ga, In) with group V elements (essentially N, P, As, Sb). These semiconductor compounds can be difficult to integrate with more conventional integrated photonics such as Silicon compatible waveguides. In the architecture disclosed herein standard high bandwidth Silicon waveguide-integrated Germanium photodetectors can be used by splitting the optical power across N channels and then combining the photocurrents electrically. Consequently, any photodetector saturation effects are mitigated because each photodetector receives only 1/N of the power.

A further advantage is that the disclosed system supports wideband RF microwave carriers (in the 3 GHz to 300 GHz range). Wideband photodetectors typically do not exhibit a lower limit in terms of bandwidth, and are often limited only by the electrical output network. Accordingly, it is anticipated that the bandwidth of a system as disclosed herein would be limited only by the photodiode technology and electrical matching network of the RF combining array. This broad bandwidth capability can be advantageously accompanied by size, weight, power and cost reductions due to the use of integrated photonics, including single electrical and optical packaging interfaces.

Figure 6:
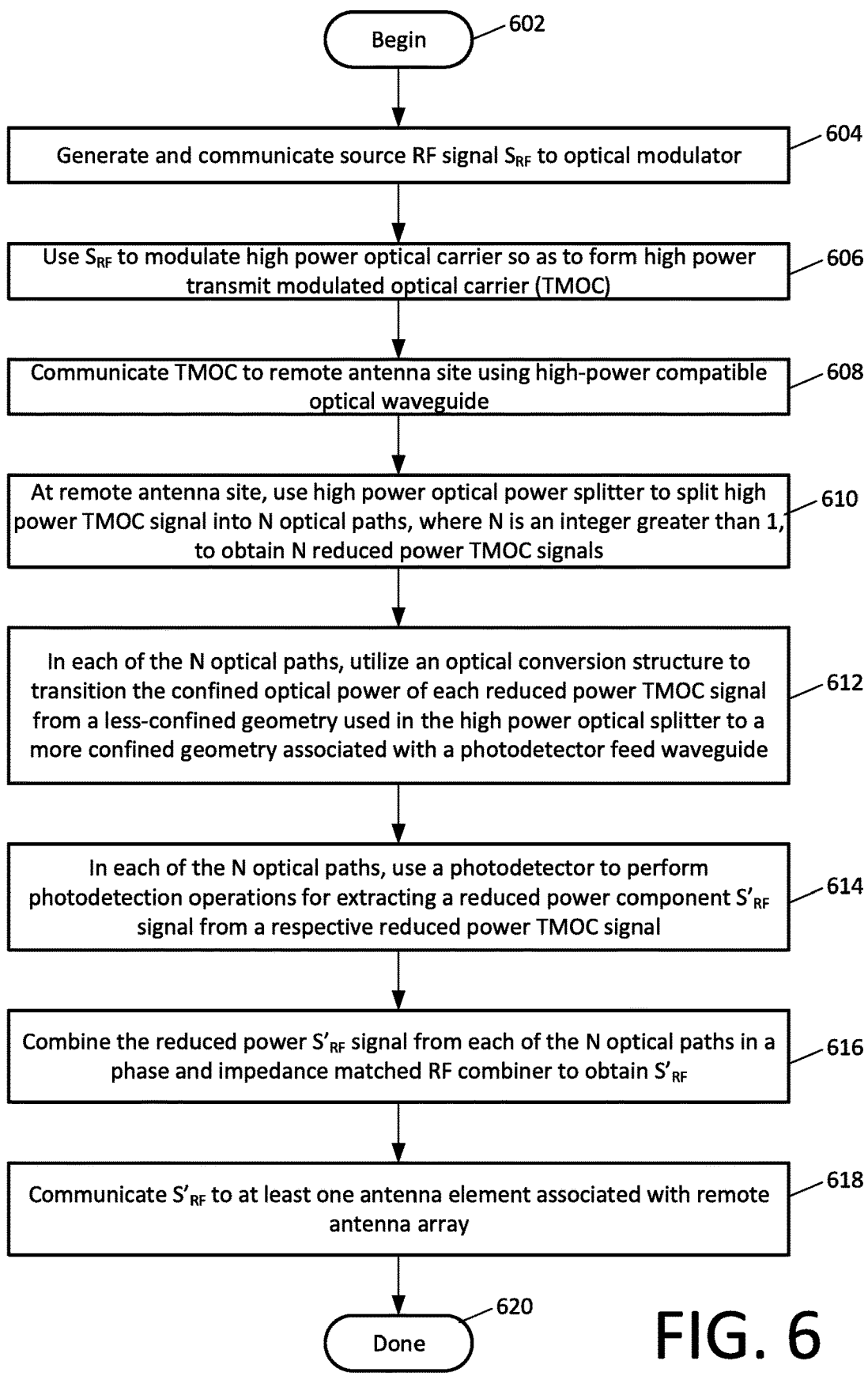
FIG. 6 is a flowchart that is useful for understanding how a high power RF signal for phased array operations can be generated at an antenna location which is remote from an RF signal source.

Referring now to FIG. 6, there is shown a flowchart that is useful for understanding a process for providing a high power RF signal to a remote antenna system using optical transmission means. The method begins at 602 and continues at 604 where an RF signal is generated in an RF source and communicated to an optical modulator. At 606 the $S_{RF}$ signal is used to modulate a high power optical carrier so as to form a high power transmit modulated optical carrier (TMOC). The TMOC is communicated at 608 to a remote antenna site using a high-power compatible optical waveguide (e.g., a high power compatible optical fiber). The antenna site can be comprised of a single antenna element, or an array comprised of a plurality of antenna elements which may be used to facilitate beam steering and beam forming in a phased array configuration.

When the TMOC signal is received at the remote antenna site one or more optical processing steps are performed. These steps can include 610 using a high power optical power splitter to split the high power TMOC signal into N optical paths, where N is an integer greater than 1, to obtain N reduced power TMOC signals. The process continues at 612 and 614 where certain operations are performed in parallel using processing elements provided in each of the N optical paths. At 612 an optical conversion structure is used in each optical path to transition the confined optical power of each reduced power TMOC signal from a less-confined geometry used in the high power optical splitter to a more confined geometry associated with a photodetector feed waveguide. Thereafter, at 614 a photodetector provided in each of the N optical paths is used to perform photodetection operations for extracting a reduced power component $S'_{RF}$ signal from a respective reduced power TMOC signal.

Following the parallel operations at 612 and 614, the reduced power component $S'_{RF}$ signals from each of the N optical paths are combined 616 in a phase and impedance matched RF power combiner to obtain a high power $S'_{RF}$ signal from the N reduced power component $S'_{RF}$ signals. The high power $S'_{RF}$ signal will be essentially the same signal as the original $S_{RF}$ signal used to modulate the RF transceiver, subject to any phase or amplitude changes which may have resulted from the optical processing.

Once the high power $S'_{RF}$ signal has been obtained in this way, the process continues at 618 where the high-power $S'_{RF}$ signal is communicated to at least one antenna element associated with a remote antenna array. In some scenarios, phase and/or amplitude adjustments can be applied to the high-power $S'_{RF}$ signal so as to facilitate phased array beam steering and forming operations. Thereafter the process can terminate at 620 or can continue with other operations.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the disclosure provided here has been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above described embodiments. Rather, the scope of the invention should be defined in accordance with the following claims and their equivalents.

We claim:

1. A method for delivering a radio frequency (RF) signal to a remote phased array antenna system, comprising:

using an optical modulator at an RF source location to modulate an optical carrier signal with a source RF signal $S_{RF}$ so as to produce a high power transmit modulated optical carrier (TMOC) signal;

using an optical link comprised of an optical fiber to communicate the high power TMOC signal from the RF source location to an antenna location associated with an RF antenna system, the antenna location remote from the RF source location;

at the antenna location, splitting the high power TMOC into N optical paths to obtain N reduced power TMOC signals, where N is an integer value greater than 1;

in each of the N optical paths, performing a photodetection operation upon the reduced power TMOC signal to obtain N reduced power $S'_{RF}$ signals;

constructively combining the N reduced power $S'_{RF}$ signals in an RF power combiner to obtain a high power $S'_{RF}$ signal;

communicating at least a portion of the high power $S'_{RF}$ signal to at least one antenna element of said RF antenna system; and choosing a value of N such that a multiplicity of reduced power $S'_{RF}$ signals are combined in the combining step, whereby a power level of the high power $S'_{RF}$ signal exceeds a maximum power handling ability of a photodetector used in each of the N optical paths.

2. The method according to claim 1, further comprising preventing distortion of $S_{RF}$ signal carried by the TMOC by limiting the interaction of high optical powers with high confinement optical waveguides.

3. The method according to claim 2, further comprising using an optical conversion structure to optically convert the reduced power TMOC from a less-confined geometry associated with a high power waveguide used in a high power optical splitter to a more confined geometry associated with a feed waveguide for a photodetector.

4. The method according to claim 3, further comprising selecting the optical conversion structure to include an adiabatic-type waveguide transition, whereby the optical conversion is performed with low optical loss.

5. The method according to claim 3, further comprising performing all of the splitting, optical converting, and RF power combining for producing the high-power $S'_{RF}$ signal on an integrated circuit formed on a Silicon substrate.

6. A method for delivering a radio frequency (RF) signal to a remote phased array antenna system, comprising:

using an optical modulator at an RF source location to modulate an optical carrier signal with a source RF signal $S_{RF}$ so as to produce a high power transmit modulated optical carrier (TMOC) signal;

using an optical link comprised of an optical fiber to communicate the high power TMOC signal from the RF source location to an antenna location associated with an RF antenna system, the antenna location remote from the RF source location;

at the antenna location, splitting the high power TMOC into N optical paths to obtain N reduced power TMOC signals, where N is an integer value greater than 1;

in each of the N optical paths, performing a photodetection operation upon the reduced power TMOC signal to obtain N reduced power $S'_{RF}$ signals;

constructively combining the N reduced power $S'_{RF}$ signals in an RF power combiner to obtain a high power $S'_{RF}$ signal;

communicating at least a portion of the high power $S'_{RF}$ signal to at least one antenna element of said RF antenna system; and further comprising dynamically varying a phase of the high power $S'_{RF}$ signal prior to communicating the high power $S'_{RF}$ signal to the at least one antenna element;

wherein the at least one antenna element is one of a plurality of antenna elements comprising an array, and the method further comprises coordinating the phase variation applied to the high power $S'_{RF}$ signal to facilitate a phased array beam forming operation.

7. A phased array communication system, comprising:

an optical modulator at an RF source location which is configured to modulate a an optical carrier signal with a source RF signal $S_{RF}$ so as to produce a high power transmit modulated optical carrier (TMOC) signal;

an optical link comprised of an optical fiber configured to communicate the high power TMOC signal from the RF source location to an antenna location associated with an RF antenna system, the antenna location remote from the RF source location;

a high power optical power splitter disposed at the antenna location and configured to split the high power TMOC into N optical paths to obtain N reduced power TMOC signals, where N is an integer value greater than 1;

wherein each of the N optical paths is comprised of
 a photodetector configured to produce a reduced power $S'_{RF}$ signal from the reduced power TMOC signal;
 a feed waveguide configured for coupling one of the N reduced power TMOC signals to the photodetector; and
 an optical conversion structure configured to optically convert the reduced power TMOC signal from a less-confined geometry associated with a high power waveguide used in the high power optical power splitter to a more confined geometry associated with the feed waveguide;

an RF combiner configured to receive the reduced power $S'_{RF}$ signal from each of the N optical paths, and constructively combine the N reduced power $S'_{RF}$ signals to obtain a high power $S'_{RF}$ signal; and at least one phase control element responsive to a control system and configured to dynamically steer an RF beam produced using the high power $S'_{RF}$ signal by dynamically controlling a signal phase.

8. The phased array communication system according to claim 7, wherein the optical conversion structure is an adiabatic-type waveguide transition, whereby the optical conversion is performed with low optical loss.

9. The phased array communication system according to claim 7, wherein the high power optical splitter is comprised of a splitting network which is configured to split the optical power passively in a tree of 3 dB splits.

10. The phased array communication system according to claim 7, wherein the high power optical splitter is a multi-mode interference (MMI) device which is configured to directly split the high power TMOC signal into N output waveguides.

11. The phased array communication system according to claim 7, each of the N optical paths is disposed on an integrated circuit formed on a Silicon substrate.

12. The phased array communication system according to claim 7, wherein the RF antenna system is an array comprised of a plurality of antenna elements, and the system further comprises at least one control unit configured to coordinate a phase variation applied to the high power $S'_{RF}$ signal to facilitate a phased array beam forming operation.

13. The phased array communication system according to claim 12, wherein at least one component of the control unit is an embedded processing unit included as part of the RF antenna system.

14. The phased array communication system according to claim 7, wherein the antenna location is remote from the RF source location.

15. The phased array communication system according to claim 7, including a plurality of said optical modulators which generate a plurality of the high power TMOC signals at the RF source location, wherein a plurality of optical links are configured to communicate a plurality of the high power TMOC signals from the RF source location to the RF antenna system.

16. The phased array communication system according to claim 7, wherein two or more components selected from the group consisting of the high power optical splitter, the optical conversion structure, the feed waveguide, the photodetector and the RF combiner, comprise a multi-chip material integration (MCMI) fabrication.

17. The phased array communication system according to claim 16, wherein two or more of the high power optical splitter, the optical conversion structure and the feed waveguide comprise a first integrated circuit chip on a first substrate of the MCMI fabrication.

18. The phased array communication system according to claim 17, wherein a second integrated circuit chip is comprised of the photodetector disposed on a second substrate of the MCMI fabrication.

19. The phased array communication system according to claim 18, wherein the RF combiner is disposed on a third substrate, and wherein the first and second substrates are also disposed on the third substrate whereby the third substrate is a unifying substrate of the MCMI fabrication.

* * * * *